United States Patent [19]

Bowden, III et al.

[11] Patent Number: 5,345,573
[45] Date of Patent: Sep. 6, 1994

[54] HIGH SPEED BURST READ ADDRESS GENERATION WITH HIGH SPEED TRANSFER

[75] Inventors: Raymond D. Bowden, III, Tewksbury; Chester M. Nibby, Jr., Beverly, both of Mass.

[73] Assignee: Bull HN Information Systems Inc., Billerica, Mass.

[21] Appl. No.: 771,702

[22] Filed: Oct. 4, 1991

[51] Int. Cl.⁵ .................. G11C 11/408; G11C 11/409; G06F 12/00
[52] U.S. Cl. .................. 395/400; 395/425; 365/189.02; 365/189.05; 365/230.03; 365/230.04
[58] Field of Search .............. 365/189.02, 189.05, 365/230.02, 230.03, 230.04; 395/400, 425; 364/DIG. 1, DIG. 2

[56] References Cited

U.S. PATENT DOCUMENTS

| | | | |
|---|---|---|---|
| 4,366,539 | 12/1982 | Johnson et al. | 395/425 |
| 4,370,712 | 1/1983 | Johnson et al. | 395/425 |
| 5,134,699 | 7/1992 | Aria et al. | 395/425 |
| 5,191,657 | 3/1993 | Ludwig et al. | 395/325 |
| 5,218,686 | 6/1993 | Thayer | 395/425 |

FOREIGN PATENT DOCUMENTS

| | | |
|---|---|---|
| 0348113 | 12/1989 | European Pat. Off. . |
| 0440456 | 7/1991 | European Pat. Off. . |
| 2230117 | 10/1990 | United Kingdom . |

OTHER PUBLICATIONS

"Multiple and Burst Cycle Bus Transfers", i486 TM Microprocessor, Nov. 1989, pp. 96, 98, 104–105.

*Primary Examiner*—Joseph L. Dixon
*Assistant Examiner*—Jack A. Lane
*Attorney, Agent, or Firm*—Faith F. Driscoll; John S. Solakian

[57] ABSTRACT

A memory system coupled to a local bus of a microprocessor includes at least a pair of dynamic random access memories (DRAMs) and includes circuits for storing the first address of an address sequence at the beginning of each burst operation and uses predetermined bits to generate any one of a set of address sequences as a function of the states of these bits. A first predetermined address bit is used to select different sequences of addressed readout data words to be transferred by the pair of DRAMs to the user. A second predetermined address bit is complemented to reverse two high order addressed word responses with two low order addressed word responses of specific address sequences. These operations are utilized in all of the required address sequences within different subgroups.

10 Claims, 2 Drawing Sheets

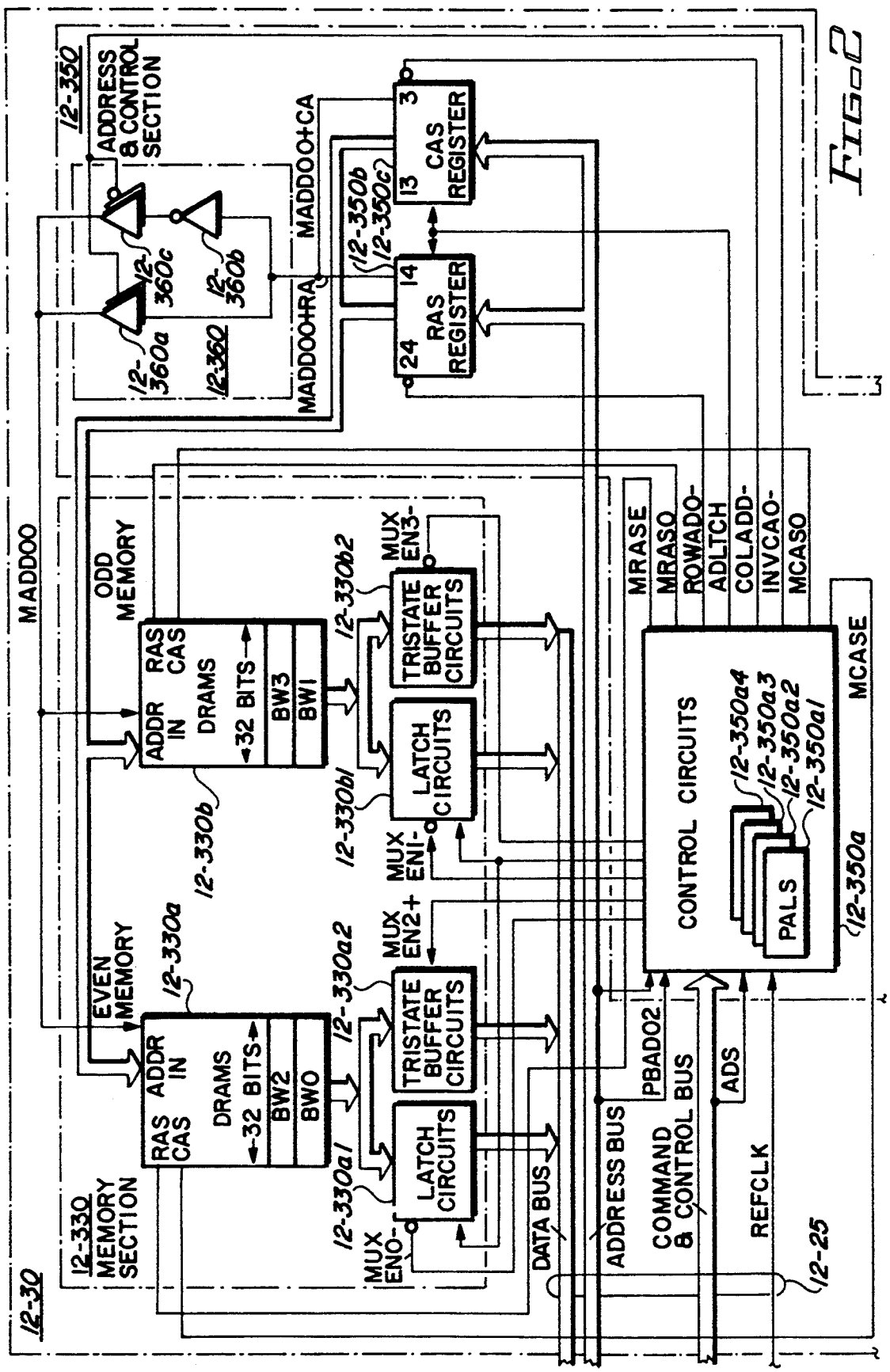

HIGH SPEED BURST READ ADDRESS GENERATION WITH HIGH SPEED TRANSFER

RELATED PATENT APPLICATIONS

The patent application of Raymond D. Bowden, III, Richard A. Lemay, Chester M. Nibby, Jr. and Jeffrey S. Somers entitled, "High Performance Burst Read Data Transfer Operation," filed Oct. 4, 1991 bearing Ser. No. 07/771,703, now U.S. Pat. No. 5,291,580, which is assigned to the same assignee as this patent application.

BACKGROUND OF THE INVENTION

1. Field of Use

The present invention relates to memory systems and more particularly to transfers of multiple words between a memory system and a data processing unit.

2. Prior Art

It is well known to construct a memory system from a plurality of memory modules. Certain prior art systems pair memory modules together to provide a double word fetch capability. The term double word fetch refers to the ability to access a pair of words at a time from a memory during a memory cycle of operation.

In such systems, it becomes desirable to be able to include the capability of transferring over a single bus during successive cycles of operation, groups of multiple words simultaneously accessed during a memory cycle of operation without incurring communication delays. This capability is termed a burst mode transfer. For an example of this type of system, reference may be made to U.S. Pat. Nos. 4,366,539 and 4,370,712.

In a high performance system, such as an Intel 486 based microprocessor and DRAM system, up to 16 bytes can be transferred at a time during a burst read operation. In such a system, the addresses of the data items in the burst read operation will all fall without the same 16-byte aligned area which corresponds to an internal microprocessor cache line. In each burst operation, it is required that the data words be returned to the requesting user in a special sequence which is a function of the first requested address received from the user. For example, if the first address was zero, the following addresses must be 4, 8 and C (Here). For an initial address of 4, the sequence is 0, C and 8. The remaining sequences are 8, C, 0, 4 and C, 8, 4 and 0.

It has been proposed that given the first address in a burst, external hardware can easily calculate the address of subsequent transfers in advance. This is discussed in the publication entitled, "i486 ® microprocessor", published by Intel Corporation, November, 1989. It has been found that capturing the first address in a register/counter implemented using a programmable array logic element (PAL) and then programming the PAL to generate the required address sequence earlier than required improves performance. However, this approach still requires that sufficient time be available in advance following receipt of the burst request to generate the particular address sequence. Also, there must be sufficient time provided to carry out the entire address generation process.

It is a primary object of the present invention to provide a system for generating a set of address sequences within a minimum amount of time.

SUMMARY OF THE INVENTION

The above object and advantages of the present invention are achieved in a preferred embodiment of a memory system which incorporates the principles of the invention. The memory system which couples to the command, address and sections of a local bus of a microprocessor includes at least a pair of dynamic random access memories (DRAMs). The DRAMs are organized for storing equal portions of a byte aligned area containing a preestablished number of bytes which corresponds to an internal cache line of cache included within the microprocessor. In the preferred embodiment, the DRAM memories are organized for storing even and odd words. The width of each DRAM memory is the same as the width of the bus data section.

The memory system includes means for storing the first or initial address of a sequence of addresses generated by the microprocessor or other user applied to the microprocessor's local bus at the beginning of each burst operation. The states of address bits are used directly or selectively modified to enable the addressing of the appropriate groups of words during successive read cycles of operation and the transfer of the appropriate words specified by the initial address in the particular address sequence. More particularly, predetermined address bits of the initial address are examined to determine which subgroup of address sequences within the set of sequences is required to be generated. A first predetermined address bit of each initial address is used for causing the proper sequences of addressed data words read out from the pair of DRAMs to be transferred to the user. A second predetermined one of the predetermined address bits is used to generate the first column address portion of the initial address and then complemented for generating the second column address portion. This results in a reversal in the two high order addressed word responses with the two low order addressed word responses of specific address sequences which provides the other or remaining address sequences within the different subgroups.

By taking advantage of existing memory signals, the arrangement of the present invention provides a simple address mechanism which does not detract from memory performance while providing for the return of the required sequences of data words to the requesting user. Furthermore, the arrangement requires that no more than a single operation be performed on an initial given address for generating all of the required addresses of each sequence. This enables the memory to operate at optimum performance.

The above and other objects and advantages of the present invention will be better understood from the following detailed description taken in conjunction with the accompanying drawings.

BRIEF DESCRIPTION OF THE DRAWINGS

FIG. 2 is a block diagram of the local memory of FIG. 1.

DETAILED DESCRIPTION OF THE PREFERRED EMBODIMENT

Description of FIG. 1

Figure 1:
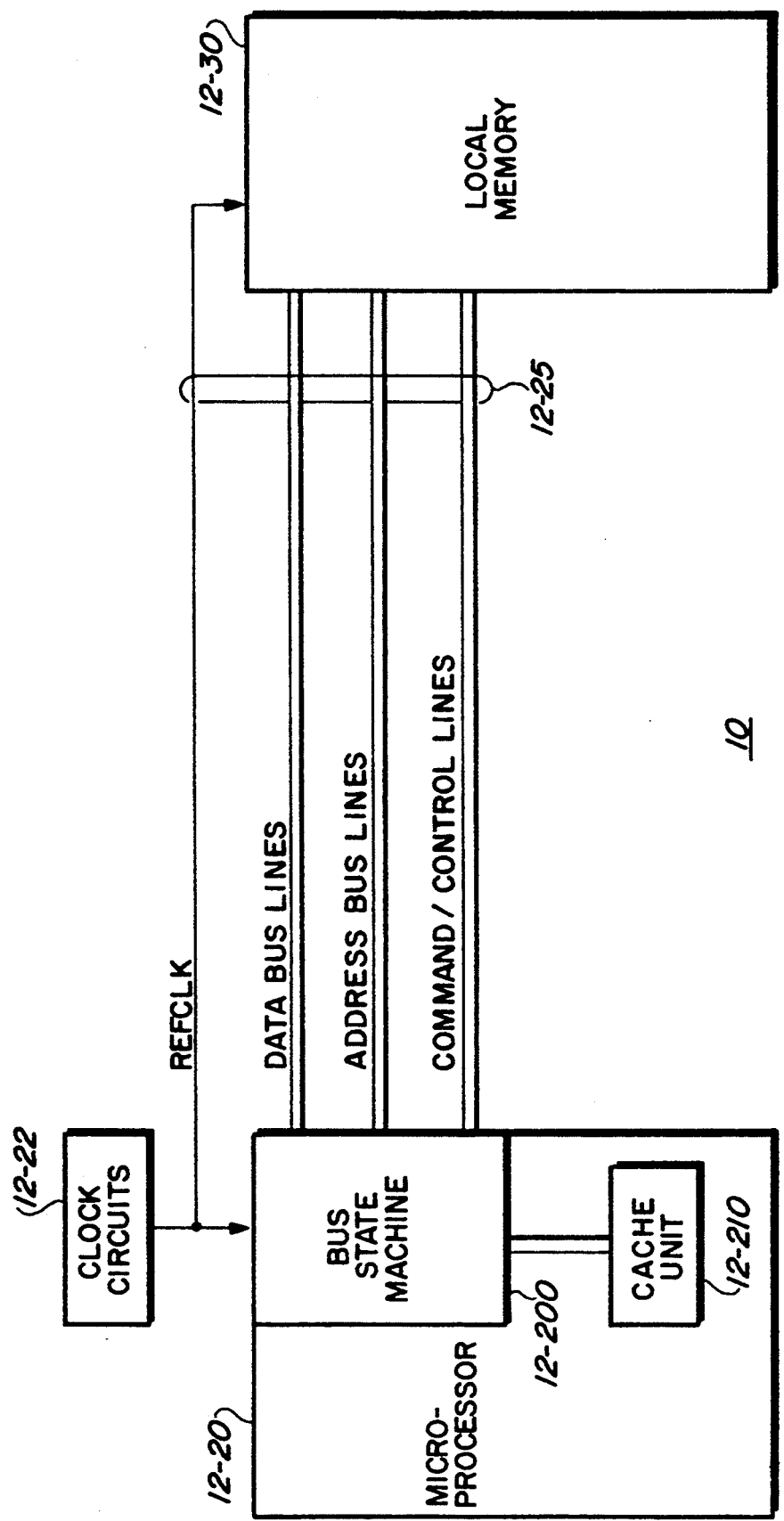
FIG. 1 is a block diagram of a system which incorporates the apparatus of the present invention.

Referring to FIG. 1, it is seen that includes a microprocessor 12-20 which tightly couples a local memory 12-30 through a local processor bus 12-25. The microprocessor 12-20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, a memory cache controller and an 8K RAM cache unit, collectively labeled as block 12-210 in FIG. 1. The principal processing function is performed by the microprocessor while complex processing functions, such as floating operations, are performed by the math coprocessor. The internal cache unit 12-210 provides fast access to the data required for processing.

The system further includes the clock generation circuits of block 12-22 which generate a single frequency clock signal REFCLK of 33 MHz which provides the fundamental timing and internal operating frequency for microprocessor 12-20, in addition to all of the other circuits which make up system 10.

In greater detail, the microprocessor 12-20 and local memory 12-30 are tightly coupled to the address, data and command/control bus lines of local bus 12-25, as shown. The microprocessor's bus interface couples internally to a bus state machine 12-200. State machine 12-200 is used to control the microprocessor's access to local bus 12-25 by the generation of the proper bus protocol. For further information regarding the microprocessor and for descriptions of the signals used in conjunction with such microprocessor, reference may be made to the publication entitled, "i486 ® Microprocessor", published by Intel Corporation, Copyright 1989.

Description of FIG. 2

FIG. 2 shows in greater detail, the local memory 12-30. As shown, memory 12-30 includes a memory section 12-330 and an address and control section 12-350. The memory section 12-330 includes a 64-bit wide memory which includes 32-bit wide even and odd dynamic random access memory DRAM units 12-330a and 12-330b. Each of the DRAM units 12-330a and 12-330b include 32, 4 megabit DRAM chips which provide 32-bit bus words which are read out either to the D-type transparent latch circuits of blocks 12-330a1/12-330b1 or to the tristate buffer driver circuits of blocks 12-330a2/12-330b2 for application to the 32-bit wide data bus of local bus 12-25. According to the present invention, these circuits are selectively enabled by different ones of the control signals MUXEN0—, MUXEN2+, MUXEN1— and MUXEN3— as shown in FIG. 2.

The DRAM chips normally are 80 nanosecond arrays. These chips are designed to operate in a fast page mode as a high speed access mode wherein successive memory cycles defined by a corresponding number of column address strobe (CAS) signals are performed during an interval defined by a single row address strobe (RAS) signal. The DRAM chips take the form of CMOS dynamic RAM organized 4,194,304 word × 1 bit chips designated as HM514100, manufactured by Hitachi America, Ltd. The apparatus disclosed in the referenced related patent application can be used to generate the successive CAS signals.

The address sequence and control section 12-350 includes the programmable array logic (PAL) control circuits 12-350a1 through 12-350a4 of block 12-350a. The signals MCASE and MCASO are applied to the CAS input terminals of the DRAM chips of the even and odd memories 12-330a and 12-330b.

Additionally, address and control section 12-350 include a row address strobe register 12-350b and a column address strobe register 12-350c. These registers are loaded with the row address and column address portions (i.e., bits 24-14 and bits 13-3) of the 32-bit memory array address applied to the address bus portions of local bus 12-25, in response to load signal ADLTCH-, generated by an address latch PAL circuit 12-350a4 of block 12-350a. The address bit contents of RAS register 12-350b and CAS register 12-350c are applied in succession of the address inputs of the DRAM chips of memories 12-330a and 12-330b, in response to enable signals ROWADD- and COLADD-.

In accordance with the teachings of the present invention, address and control section 12-350 further includes a pair of parallel connected tristate driver circuits 12-360a and 12-360c and an inverter circuit 12-360b. The tristate driver circuit 12-360a receives the least significant memory address bit of the row and column addresses and applies the address bit unchanged to the least significant address bit input terminal of each of the DRAM chips of memories 12-330a and 12-330b, in the absence of tristate control signal INVCAO-.

Inverter circuit 12-360b inverts or complements signal MADDOO and applies it as an input to the tristate driver circuit 12-360c. This circuit, in response to tristate control signal INVCAO-, applies the inversion of signal MADDOO as an input to the least significant address bit terminal of each of the DRAM chips of memories 12-330a and 12-330b. The tristate control signal INVCAO- generated by an invert address generator PAL circuit 12-350a1 of block 12-350a.

The data words read out into the output circuits 12-330a1 through 12-330b2 are selectively transferred to the data bus section of bus 12-25 as a function of the states of signals MUXEN0 through MUXEN3. These signals are generated by the multiplexer enable and multiplexer output generator PAL circuits 12-350a2 and 12-350a3 of block 12-350a. The descriptions of PAL circuits and equations for generating different ones of the control signals are set forth in the Appendix.

DESCRIPTION OF OPERATION

With reference to FIGS. 1 and 2, the operation of the apparatus of the present invention will now be described. As discussed, microprocessor 12-20 uses the burst order address sequence shown in Table I below.

TABLE I

| FIRST ADDRESS (HEX) | SECOND ADDRESS | THIRD ADDRESS | FOURTH ADDRESS |
| --- | --- | --- | --- |
| 0 | 4 | 8 | C |
| 4 | 0 | C | 8 |
| 8 | C | 0 | 4 |
| C | 8 | 4 | 0 |

The microprocessor 12-20 presents each data request in an order determined by the first address in the sequence of addresses it transfers to local memory 12-30. For example, if the first address was 1004, the next three addresses in the sequence will be 1000, 100C and 1008. Since these addresses correspond to byte address values, the address sequence of Table I can be redefined in terms of bus word addresses in Table II below.

TABLE II

| | FIRST ADDRESS | SECOND ADDRESS | THIRD ADDRESS | FOURTH ADDRESS |
| --- | --- | --- | --- | --- |
| CASE 1 | 0 | 1 | 2 | 3 |
| CASE 2 | 1 | 0 | 3 | 2 |

TABLE II-continued

| | FIRST ADDRESS | SECOND ADDRESS | THIRD ADDRESS | FOURTH ADDRESS |
|---|---|---|---|---|
| CASE 3 | 2 | 3 | 0 | 1 |
| CASE 4 | 3 | 2 | 1 | 0 |

In the above table, each bus word consists of four bytes.

As previously described, the memory section 12-330 is organized into two 32-bit wide even and odd memories 12-330a and 12-330b so as to have the total width of the memory no more than twice the width of the data bus of local bus 12-25.

In accordance with the present invention, the first address that microprocessor 12-20 places on the address lines of bus 12-25, along with address strobe signal ADS-, is loaded into the RAS and CAS registers 12-350b and 12-350c, in response to address latch signal ADLTCH, generated by the control circuits of block 12-350a. Additionally, the state of bus address bit PBAD02+ is stored by the control circuits of block 12-350a. The state of address bit A02 is used to provide the proper sequences of addressed bus words to be transferred to the data lines of bus 12-25. The four word sequence corresponding to the 16 byte cache line is obtained by performing two successive memory read cycles of operation wherein two 32-bit bus words are read out during each cycle and transferred serially onto bus 12-25.

According to the present invention, the above operation is divided into two stages or parts and is illustrated in Table III below.

TABLE III

| DATAWORD | FROM BUS 12-25 | A03 OPERATION |
|---|---|---|
| ADDRESS(A03) ADDRESS SEQ | 0 | FLIP TO 1 0, 1, 2, 3 |
| DATAWORD ADDRESS(A03) ADDRESS SEQ | 1 | FLIP TO 0 2, 3, 0, 1 |

As seen from Table III, bus address bit PBAD03 which corresponds to CAS address register bit 0 is used to perform the address sequence reversals between cases 1 and 3 or cases 2 and 4 of Table II. That is, the state of bit A03 is used in its original form as CAS address bit signal MADD00 which is loaded into the DRAM chips of memories 12-330a and 12-330b, in response to a first CAS signal applied to the DRAM CAS input terminals during the first memory read cycle. The state of the address bit A03 corresponding to CAS address bit signal MADD00 is flipped or inverted in response to invert column address signal INVCA0- generated by the control circuits of block 12-350a.

This results in reversing the two high order data words with the two low order data words. That is, during the second memory read cycle, the words addressed and read out from memories 12-330a and 12-330b correspond to bus words 2 and 3 rather than bus words 0 and 1. The reverse in address sequence for different initial values of address bit 3 is shown in Table III.

The next or second stage involves obtaining the address sequence reversals for cases 1 and 2 or 3 and 4 of Table II. This is accomplished by selectively conditioning the output enable circuits of blocks 12-330a1 through 12-330b2 to perform the reversals according to the state of bus address bit A02. In greater detail, when bus address bit A02 is a ZERO, the bus data words are delivered to bus 12-25 by latch circuits 12-330a1 and 12-330b1 and tristate driver buffer circuits 12-330a2 and 12-330b2 as shown in cases 1 and 3 of Table II. When bus address bit A02 equals a binary ONE, the bus data words are delivered by latch circuits 12-330b1 and 12-330a1 and tristate driver buffer circuits 12-330b2 and 12-330a2 as shown in cases 2 and 4 of Table II. The selective conditioning for this sequencing is defined by the data path enable output signals MUXEN0− through MUXEN3− generated by PAL control circuits of block 12-350a. The PAL circuits are programmed to store and generate the required sequence of signals as a function of the state of bus address signal PBAD02+.

The above described operations are summarized in Table IV below.

TABLE IV

| FIRST ADDRESSED WORD | WORD ADDRESS SEQUENCE | ADDRESS BIT 3 OPERATION 1st Cycle | ADDRESS BIT 3 OPERATION 2nd Cycle | ADDRESS BIT 2 OPERATION |
|---|---|---|---|---|
| CASE 1 = 0 | 0, 1, 2, 3 | X, | X + 1 | No reversal of output data paths (A02 = 0) |
| CASE 2 = 1 | 1, 0, 3, 2 | X, | X + 1 | Reversal of output data paths (A02 = 1) |
| CASE 3 = 2 | 2, 3, 0, 1 | X, | X − 1 | No reversal (A02 = 0) |
| CASE 4 = 3 | 3, 2, 1, 0 | X, | X − 1 | Reversal of output data paths (A02 = 1) | where X = the value A03.

The above has shown how the required burst read address sequences can be generated to provide the required sequence of data words with a minimum of additional circuits, by using the states of predetermined address bits of each initial address of a burst address sequence.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

APPENDIX

Description of equation symbols:
(Where # = OR: ! = negation; and & = AND)

INVERT ADDRESS SIGNAL GENERATOR PAL CIRCUIT 12-350a1

DEVICE          20R8-7

MODULE XCD12

Pin Specifications:
(Inputs)

```
REFCLK       PIN    1;  "REFCLK+31
DBCLR        PIN    2;  "DBCLR+00
DBADS        PIN    3;  "DBADS+10
!DBWRRD      PIN    5;  "DBWRRD-10
!DBBLAST     PIN    6;  "DBBLAST-00
PBAD02       PIN    7;  "PBAD02+10
PBAD31       PIN    8;  "PBAD31-10
PBAD30       PIN    9;  "PBAD30-10
DBMMIO       PIN   10;  "DBMMIO-10
LOGIC0       PIN   13;  "LOGIC0-02
```

(Outputs)

```
!INVCA0      PIN   15;  "INVCA0-00
!DB_BRDY     PIN   17;  "DB-BRDY-00

Q3,Q2,Q1,Q0  PIN   22,21,20,19; "State bits.
```

"Equates.

```
STATE0 = ^HF;
STATE1 = ^H4;
STATE2 = ^HA;
STATE3 = ^H8;
STATE4 = ^HC;
STATE6 = ^HE;
STATE8 = ^HB;
STATEA = ^H9;
STATEB = ^H2;
STATEC = ^H0;
STATED = ^HD;
```

```
FALSE = 0;
TRUE  = 1;

MEMACC = PBAD31 & PBAD30 & DBADS & !DBMMIO ;

QSTATE = [Q3,Q2,Q1,Q0];

"Actual logic equations.

equations state_diagram QSTATE

State STATE0:   " Idle, waiting for a regular access.

" Reset.
        IF (DBCLR) THEN STATE0
                WITH    INVCA0   := FALSE;
                        DB_BRDY  := FALSE;
                ENDWITH;

" No access.
        IF (!MEMACC & !DBCLR) THEN STATE0
                WITH    INVCA0   := FALSE;
                        DB_BRDY  := FALSE;
                ENDWITH;

" Read access.
        IF (MEMACC & !DBWRRD & !DBCLR) THEN STATEC
                WITH    INVCA0   := FALSE;
                        DB_BRDY  := FALSE;
                ENDWITH;

State STATEC:  " Normal access, wait before asserting
                 cas.

" Reset.
        IF (DBCLR) THEN STATE0
                WITH    INVCA0   := FALSE;
                        DB_BRDY  := FALSE;
                ENDWITH;
        IF (!DBCLR & !DBWRRD) THEN STATE8
                WITH    INVCA0   := FALSE;
                        DB_BRDY  := FALSE;
                ENDWITH;

IF (!DBCLR &  DBWRRD) THEN STATE8
                WITH    INVCA0   := FALSE;
                        DB_BRDY  := FALSE;
                ENDWITH;

State STATE8:  " Assert CAS.

" Reset.
        IF (DBCLR) THEN STATE0
                WITH    INVCA0   := FALSE;
```

```
                    DB_BRDY   := FALSE;
            ENDWITH;

" Read access.
    IF (!DBCLR & !DBWRRD ) THEN STATEA
        WITH    INVCA0   := FALSE;
                DB_BRDY  := FALSE;
        ENDWITH;

State STATEA: " Even and odd cas asserted one clock,
            read access.

" Reset.
    IF (DBCLR) THEN STATE0
        WITH    INVCA0   := FALSE;
                DB_BRDY  := FALSE;
        ENDWITH;

" Blast not asserted, multiple transfer.
    IF (!DBCLR & !DBBLAST & !PBAD02) THEN STATE1
        WITH    INVCA0   := TRUE;
                DB_BRDY  := TRUE;
        ENDWITH;

" Blast not asserted, multiple transfer.
    IF (!DBCLR & !DBBLAST &  PBAD02) THEN STATE1
        WITH    INVCA0   := TRUE;
                DB_BRDY  := TRUE;
        ENDWITH;
    " Blast asserted, single even word transfer.
    IF (!DBCLR & DBBLAST & !PBAD02) THEN STATE0
        WITH    INVCA0   := FALSE;
                DB_BRDY  := TRUE;
        ENDWITH;

" Blast asserted, single odd transfer.
    IF (!DBCLR & DBBLAST &  PBAD02) THEN STATE0
        WITH    INVCA0   := FALSE;
                DB_BRDY  := TRUE;
        ENDWITH;

State STATE1: " Read access, first word returned to
            microprocessor.

" Reset.
    IF (DBCLR) THEN STATE0
        WITH    INVCA0   := FALSE;
                DB_BRDY  := FALSE;
        ENDWITH;

" Even word returned.
    IF (!PBAD02 & !DBCLR ) THEN STATE2
        WITH    INVCA0   := TRUE;
                DB_BRDY  := TRUE;
        ENDWITH;
```

```
           " Odd word returned.
           IF (PBAD02 & !DBCLR ) THEN STATE2
                WITH    INVCA0   := TRUE;
                        DB_BRDY  := TRUE;
                ENDWITH;

State STATE2: " Read access, second word returned to
                microprocessor.

" Reset.
           IF (DBCLR) THEN STATE0
                WITH    INVCA0   := FALSE;
                        DB_BRDY  := FALSE;
                ENDWITH;

" Odd word returned, blast unasserted.
           IF (!PBAD02 & !DBCLR & !DBBLAST) THEN STATE3
                WITH    INVCA0   := TRUE;
                        DB_BRDY  := TRUE;
                ENDWITH;

" Even word returned, blast unasserted.
           IF (PBAD02 & !DBCLR & !DBBLAST) THEN STATE3
                WITH    INVCA0   := TRUE;
                        DB_BRDY  := TRUE;
                ENDWITH;

" Blast asserted.
           IF (DBBLAST) THEN STATE4
                WITH    INVCA0   := TRUE;
                        DB_BRDY  := FALSE;
                ENDWITH;

State STATE3: " Read access.

" Reset.
           IF (DBCLR) THEN STATE0
                WITH    INVCA0   := FALSE;
                        DB_BRDY  := FALSE;
                ENDWITH;

" Blast unasserted.
           IF (!DBCLR & !DBBLAST & !PBAD02) THEN STATE0
                WITH    INVCA0   := FALSE;
                        DB_BRDY  := TRUE;
                ENDWITH;

" Blast unasserted, 2nd odd word returned.
           IF (!DBCLR & !DBBLAST & PBAD02) THEN STATE0
                WITH    INVCA0   := FALSE;
                        DB_BRDY  := TRUE;
                ENDWITH;

" Blast asserted, 2nd even word returned.
           IF (!DBCLR & DBBLAST & !PBAD02) THEN STATE6
                WITH    INVCA0   := FALSE;
                        DB_BRDY  := FALSE;
                ENDWITH;
```

```
" Blast asserted, 2nd odd word returned.
IF (!DBCLR & DBBLAST & PBAD02) THEN STATE6
        WITH    INVCA0    := FALSE;
                DB_BRDY   := FALSE;
        ENDWITH;
State STATE4: " Precharge RAS look for access.

" Reset.
        IF (DBCLR) THEN STATE0
                WITH    INVCA0    := FALSE;
                        DB_BRDY   := FALSE;
                ENDWITH;

" No access.
        IF (!DBCLR & !MEMACC) THEN STATE6
                WITH    INVCA0    := FALSE;
                        DB_BRDY   := FALSE;
                ENDWITH;

" Access.
        IF (!DBCLR &  MEMACC) THEN STATEB
                WITH    INVCA0    := FALSE;
                        DB_BRDY   := FALSE;
                ENDWITH;

State STATE6: " Precharge RAS look for access.

" Reset.
        IF (DBCLR) THEN STATE0
                WITH    INVCA0    := FALSE;
                        DB_BRDY   := FALSE;
                ENDWITH;

" No access.
        IF (!DBCLR & !MEMACC) THEN STATE0
                WITH    INVCA0    := FALSE;
                        DB_BRDY   := FALSE;
                ENDWITH;

" Access.
        IF (!DBCLR &  MEMACC) THEN STATED
                WITH    INVCA0    := FALSE;
                        DB_BRDY   := FALSE;
                ENDWITH;

State STATEB:

" Reset.
        IF (DBCLR) THEN STATE0
                WITH    INVCA0    := FALSE;
                        DB_BRDY   := FALSE;
                ENDWITH;
        " No access.
        IF (!DBCLR) THEN STATED
                WITH    INVCA0    := FALSE;
                        DB_BRDY   := FALSE;
                ENDWITH;
```

State STATED: " Precharge over. Start next access.

```
        " Reset.
        IF (DBCLR) THEN STATE0
              WITH   INVCA0    := FALSE;
                     DB_BRDY   := FALSE;
              ENDWITH;

" Regular access.
        IF (!DBCLR) THEN STATEC
              WITH   INVCA0    := FALSE;
                     DB_BRDY   := FALSE;
              ENDWITH;
```

MULTIPLEXER ENABLE PAL CIRCUIT 12-350a2

DEVICE   20R8-7

MODULE XCD17

Pin Specifications:
    (Inputs)

```
REFCLK          PIN     1;   "REFCLK+32
DBCLR           PIN     2;   "DBCLR+00
DBADS           PIN     3;   "DBADS+10
!DBWRRD         PIN     5;   "DBWRRD-10
!DBBLAST        PIN     6;   "DBBLAST-00
!PBAD25         PIN     7;   "PBAD25-10
PBAD31          PIN     8;   "PBAD31-10
PBAD30          PIN     9;   "PBAD30-10
DBMMIO          PIN    10;   "DBMMIO-10
LOGIC0          PIN    13;   "LOGIC0-03

"           (Outputs)

!MRASE          PIN    15;   "RW0RAS-02
!MRAS0          PIN    16;   "RW1RAS-02
!MUXENB         PIN    17;   "MUXENB-00

Q3,Q2,Q1,Q0 PIN    22,21,20,19; "State bits.

"Equates.
STATE0     = ^HF;
STATE1     = ^H1;
STATE2     = ^H0;
STATE3     = ^H5;
STATE4     = ^H6;
STATE8     = ^H2;
STATEA     = ^H7;
STATEB     = ^HB;
STATEC     = ^H9;
STATED     = ^HE;
STATEF     = ^HD;
```

```
FALSE = 0; TRUE = 1;

MEMACC = PBAD31 & PBAD30 & DBADS & !DBMMIO;

QSTATE = [Q3,Q2,Q1,Q0];
"Actual logic equations.

equations state_diagram QSTATE

State STATE0: " Idle, waiting for a regular access.

" Reset.
        IF (DBCLR) THEN STATE0
            WITH    MRASE  := FALSE;
                    MRASO  := FALSE;
                    MUXENB := FALSE;
            ENDWITH;

" No access.
        IF (!MEMACC & !DBCLR) THEN STATE0
            WITH    MRASE  := FALSE;
                    MRASO  := FALSE;
                    MUXENB := FALSE;
            ENDWITH;

" Read access.
        IF (MEMACC & !DBWRRD & !PBAD25 & !DBCLR ) THEN
        STATEC
            WITH    MRASE  := TRUE;
                    MRASO  := FALSE;
                    MUXENB := FALSE;
            ENDWITH;

" Read access.
        IF (MEMACC & !DBWRRD &  PBAD25 & !DBCLR ) THEN
        STATEC
            WITH    MRASE  := FALSE;
                    MRASO  := TRUE;
                    MUXENB := FALSE;
            ENDWITH;

State STATEC: " Normal access, wait before asserting
                cas.

" Reset.
        IF (DBCLR) THEN STATE0
            WITH    MRASE  := FALSE;
                    MRASO  := FALSE;
                    MUXENB := FALSE;
            ENDWITH;
        IF (!DBCLR & !PBAD25 & !DBWRRD) THEN STATE8
            WITH    MRASE  := TRUE;
                    MRASO  := FALSE;
                    MUXENB := FALSE;
            ENDWITH;
```

```
    IF (!DBCLR & PBAD25 & !DBWRRD) THEN STATE8
        WITH    MRASE  := FALSE;
                MRASO  := TRUE;
                MUXENB := FALSE;
        ENDWITH;

IF (!DBCLR & !PBAD25 & DBWRRD) THEN STATE8
        WITH    MRASE  := TRUE;
                MRASO  := FALSE;
                MUXENB := FALSE;
        ENDWITH;

IF (!DBCLR & PBAD25 &  DBWRRD) THEN STATE8
        WITH    MRASE  := FALSE;
                MRASO  := TRUE;
                MUXENB := FALSE;
        ENDWITH;

State STATE8: " Assert CAS.

" Reset.
    IF (DBCLR) THEN STATE0
        WITH    MRASE  := FALSE;
                MRASO  := FALSE;
                MUXENB := FALSE;
        ENDWITH;

" Read access, assert both even and odd cas.
    IF (!DBCLR & !DBWRRD & !PBAD25) THEN STATEA
        WITH    MRASE  := TRUE;
                MRASO  := FALSE;
                MUXENB := TRUE;
        ENDWITH;

" Read access, assert both even and odd cas.
    IF (!DBCLR & !DBWRRD &  PBAD25) THEN STATEA
        WITH    MRASE  := FALSE;
                MRASO  := TRUE;
                MUXENB := TRUE;
        ENDWITH;

State STATEA: " Even and Odd cas asserted one clock,
                read access.

" Reset.
    IF (DBCLR) THEN STATE0
        WITH    MRASE  := FALSE;
                MRASO  := FALSE;
                MUXENB := FALSE;
        ENDWITH;

" Blst not asserted, multiple transfer.
    IF (!DBCLR & !DBBLAST & !PBAD25) THEN STATE1
        WITH    MRASE  := TRUE;
                MRASO  := FALSE;
                MUXENB := FALSE;
        ENDWITH;
```

```
      " Blst not asserted, multiple transfer.
      IF (!DBCLR & !DBBLAST &  PBAD25) THEN STATE1
          WITH    MRASE  := FALSE;
                  MRASO  := TRUE;
                  MUXENB := FALSE;
          ENDWITH;

" Blst asserted, single transfer.
      IF (!DBCLR & DBBLAST ) THEN STATE0
          WITH    MRASE  := FALSE;
                  MRASO  := FALSE;
                  MUXENB := FALSE;
          ENDWITH;

State STATE1: " Read access, first word returned to
              microprocessor.

" Reset.
      IF (DBCLR) THEN STATE0
          WITH    MRASE  := FALSE;
                  MRASO  := FALSE;
                  MUXENB := FALSE;
          ENDWITH;

" Even word returned, blst not asserted.
      IF (!PBAD25 & !DBCLR ) THEN STATE2
          WITH    MRASE  := TRUE;
                  MRASO  := FALSE;
                  MUXENB := FALSE;
          ENDWITH;

" Odd word returned, blst not asserted.
      IF (PBAD25 & !DBCLR ) THEN STATE2
          WITH    MRASE  := FALSE;
                  MRASO  := TRUE;
                  MUXENB := FALSE;
          ENDWITH;

State STATE2: " Read access, second word returned to
              microprocessor.

" Reset.
      IF (DBCLR) THEN STATE0
          WITH    MRASE  := FALSE;
                  MRASO  := FALSE;
                  MUXENB := FALSE;
          ENDWITH;

" Odd word returned, blst not asserted.
      IF (!PBAD25 & !DBCLR & !DBBLAST) THEN STATE3
          WITH    MRASE  := TRUE;
                  MRASO  := FALSE;
                  MUXENB := FALSE;
          ENDWITH;

" Even word returned, blst not asserted.
      IF (PBAD25 & !DBCLR & !DBBLAST) THEN STATE3
          WITH    MRASE  := FALSE;
                  MRASO  := TRUE;
```

```
                MUXENB := FALSE;
            ENDWITH;

" Blst asserted.
    IF (DBBLAST & !PBAD25 & !DBCLR) THEN STATEB
        WITH    MRASE := TRUE;
                MRASO := FALSE;
                MUXENB := FALSE;
        ENDWITH;

" Blst asserted.
    IF (DBBLAST &  PBAD25 & !DBCLR) THEN STATEB
        WITH    MRASE := FALSE;
                MRASO := TRUE;
                MUXENB := FALSE;
        ENDWITH;

State STATE3: " Read access, a wait state.

" Reset.
    IF (DBCLR) THEN STATE0
        WITH    MRASE := FALSE;
                MRASO := FALSE;
                MUXENB := FALSE;
        ENDWITH;

" Blst unasserted.
    IF (!DBCLR & !DBBLAST ) THEN STATE0
        WITH    MRASE := FALSE;
                MRASO := FALSE;
                MUXENB := FALSE;
        ENDWITH;

" Blst asserted, 2nd even word returned.
    IF (!DBCLR & DBBLAST ) THEN STATED
        WITH    MRASE := FALSE;
                MRASO := FALSE;
                MUXENB := FALSE;
        ENDWITH;

State STATE4:

"Reset.
    IF (DBCLR) THEN STATE0
        WITH    MRASE := FALSE;
                MRASO := FALSE;
                MUXENB := FALSE;
        ENDWITH;

IF (!DBCLR) THEN STATEF
        WITH    MRASE := FALSE;
                MRASO := FALSE;
                MUXENB := FALSE;
        ENDWITH;

State STATEB:

" Reset.
    IF (DBCLR) THEN STATE0
```

```
            WITH    MRASE  := FALSE;
                    MRASO  := FALSE;
                    MUXENB := FALSE;
            ENDWITH;

IF (!DBCLR & !MEMACC) THEN STATED
            WITH    MRASE  := FALSE;
                    MRASO  := FALSE;
                    MUXENB := FALSE;
            ENDWITH;

IF (!DBCLR & MEMACC) THEN STATE4
            WITH    MRASE  := FALSE;
                    MRASO  := FALSE;
                    MUXENB := FALSE;
            ENDWITH;

State STATED: " Just raised RAS, check for DBADS.

" Reset.
        IF (DBCLR) THEN STATE0
            WITH    MRASE  := FALSE;
                    MRASO  := FALSE;
                    MUXENB := FALSE;
            ENDWITH;

IF (!DBCLR & !MEMACC) THEN STATE0
            WITH    MRASE  := FALSE;
                    MRASO  := FALSE;
                    MUXENB := FALSE;
            ENDWITH;

IF (!DBCLR & MEMACC) THEN STATEF
            WITH    MRASE  := FALSE;
                    MRASO  := FALSE;
                    MUXENB := FALSE;
            ENDWITH;

State STATEF: " Precharged RAS so do next cycle.

" Reset.
        IF (DBCLR) THEN STATE0
            WITH    MRASE  := FALSE;
                    MRASO  := FALSE;
                    MUXENB := FALSE;
            ENDWITH;

" Read access.
        IF (!DBWRRD & !PBAD25 & !DBCLR ) THEN STATEC
            WITH    MRASE  := TRUE;
                    MRASO  := FALSE;
                    MUXENB := FALSE;
            ENDWITH;

" Read access.
        IF (!DBWRRD &  PBAD25 & !DBCLR ) THEN STATEC
            WITH    MRASE  := FALSE;
                    MRASO  := TRUE;
```

```
                    MUXENB := FALSE;
            ENDWITH;
```

MULTIPLEXER OUTPUT SELECTION GENERATOR PAL CIRCUIT 12-350a3

DEVICE  16R8-7

MODULE XCD16

Pin Specifications:
(Inputs)

```
REFCLK        PIN     1;
DBCLR         PIN     2;
!MUXENB       PIN     3;
!DBBLAST      PIN     4;
PBAD02        PIN     5;

(Outputs)

!MUXEN3A      PIN    13;
MUXEN2A       PIN    14;
!MUXEN1A      PIN    15;
!MUXEN0A      PIN    16;
Q1            PIN    19;
Q0            PIN    18;

"Equates.

STATE0 = ^H1;
STATE1 = ^H0;
STATE2 = ^H2;
STATE3 = ^H3;

FALSE = 0;
TRUE  = 1;

QSTATE = [Q1,Q0];

"Actual logic equations.

equations
state_diagram QSTATE

State STATE0: "Idle, waiting for MUXENB.

IF (DBCLR) THEN STATE0
            WITH   MUXEN3A := FALSE;
                   MUXEN2A := FALSE;
                   MUXEN1A := FALSE;
                   MUXEN0A := FALSE;
            ENDWITH;

IF (!DBCLR & !MUXENB) THEN STATE0
            WITH   MUXEN3A := FALSE;
```

```
                MUXEN2A := FALSE;
                MUXEN1A := FALSE;
                MUXEN0A := FALSE;
         ENDWITH;

IF (!DBCLR & MUXENB & DBBLAST & !PBAD02) THEN
    STATE0
         WITH   MUXEN3A := FALSE;
                MUXEN2A := FALSE;
                MUXEN1A := FALSE;
                MUXEN0A := TRUE;
         ENDWITH;

IF (!DBCLR & MUXENB & DBBLAST & PBAD02) THEN
    STATE0
         WITH   MUXEN3A := FALSE;
                MUXEN2A := FALSE;
                MUXEN1A := TRUE;
                MUXEN0A := FALSE;
         ENDWITH;

IF (!DBCLR & MUXENB & !DBBLAST & !PBAD02) THEN
    STATE1
         WITH   MUXEN3A := FALSE;
                MUXEN2A := FALSE;
                MUXEN1A := FALSE;
                MUXEN0A := TRUE;
         ENDWITH;

IF (!DBCLR & MUXENB & !DBBLAST & PBAD02) THEN
    STATE1
         WITH   MUXEN3A := FALSE;
                MUXEN2A := FALSE;
                MUXEN1A := TRUE;
                MUXEN0A := FALSE;
         ENDWITH;

State STATE1:

IF (DBCLR) THEN STATE0
         WITH   MUXEN3A := FALSE;
                MUXEN2A := FALSE;
                MUXEN1A := FALSE;
                MUXEN0A := FALSE;
         ENDWITH;

IF (!DBCLR & !PBAD02) THEN STATE2
         WITH   MUXEN3A := FALSE;
                MUXEN2A := FALSE;
                MUXEN1A := TRUE;
                MUXEN0A := FALSE;
         ENDWITH;

IF (!DBCLR & PBAD02) THEN STATE2
         WITH   MUXEN3A := FALSE;
                MUXEN2A := FALSE;
                MUXEN1A := FALSE;
                MUXEN0A := TRUE;
         ENDWITH;
```

```
State STATE2:

IF (DBCLR) THEN STATE0
            WITH   MUXEN3A := FALSE;
                   MUXEN2A := FALSE;
                   MUXEN1A := FALSE;
                   MUXEN0A := FALSE;
            ENDWITH;

IF (!DBCLR &  DBBLAST & !PBAD02) THEN STATE0
            WITH   MUXEN3A := FALSE;
                   MUXEN2A := FALSE;
                   MUXEN1A := FALSE;
                   MUXEN0A := FALSE;
            ENDWITH;

IF (!DBCLR & DBBLAST & PBAD02) THEN STATE0
            WITH   MUXEN3A := FALSE;
                   MUXEN2A := FALSE;
                   MUXEN1A := FALSE;
                   MUXEN0A := FALSE;
            ENDWITH;

IF (!DBCLR & !DBBLAST & !PBAD02) THEN STATE3
            WITH   MUXEN3A := FALSE;
                   MUXEN2A := TRUE;
                   MUXEN1A := FALSE;
                   MUXEN0A := FALSE;
            ENDWITH;

IF (!DBCLR & !DBBLAST & PBAD02) THEN STATE3
            WITH   MUXEN3A := TRUE ;
                   MUXEN2A := FALSE;
                   MUXEN1A := FALSE;
                   MUXEN0A := FALSE;
            ENDWITH;

State STATE3:

IF (DBCLR) THEN STATE0
            WITH   MUXEN3A := FALSE;
                   MUXEN2A := FALSE;
                   MUXEN1A := FALSE;
                   MUXEN0A := FALSE;
            ENDWITH;

IF (!DBCLR & DBBLAST) THEN STATE0
            WITH   MUXEN3A := FALSE;
                   MUXEN2A := FALSE;
                   MUXEN1A := FALSE;
                   MUXEN0A := FALSE;
            ENDWITH;

IF (!DBCLR & !DBBLAST & !PBAD02) THEN STATE0
            WITH   MUXEN3A := TRUE;
                   MUXEN2A := FALSE;
                   MUXEN1A := FALSE;
                   MUXEN0A := FALSE;
            ENDWITH;
```

```
            IF (!DBCLR & !DBBLAST & PBAD02) THEN STATE0
                WITH    MUXEN3A := FALSE;
                        MUXEN2A := TRUE;
                        MUXEN1A := FALSE;
                        MUXEN0A := FALSE;
                ENDWITH;
```

ADDRESS LATCH ENABLE GENERATOR PAL CIRCUIT 12-350a4

DEVICE   20R8-7

MODULE XCD13

Pin Specifications:
       (Inputs)

```
REFCLK          PIN     1;      "REFCLK+31
DBCLR           PIN     2;      "DBCLR+00
DBADS           PIN     3;      "DBADS+10
!DBWRRD         PIN     5;      "DBWRRD-10
!DBBLAST        PIN     6;      "DBBLAST-00
!PBAD25         PIN     7;      "PBAD25-10
PBAD31          PIN     8;      "PBAD31-10
PBAD30          PIN     9;      "PBAD30-10
DBMMIO          PIN    10;      "DBMMIO-10
LOGIC0          PIN    13;      "LOGIC0-03

(Outputs)

!ADLTCH         PIN    18;      "ADLTCH-00

Q3,Q2,Q1,Q0     PIN    22,21,20,19;  "State bits.

"Equates.

STATE0 = ^HF;
STATE1 = ^H1;
STATE2 = ^H0;
STATE3 = ^H5;
STATE4 = ^H6;
STATE6 = ^HA;
STATE8 = ^H2;
STATEA = ^H7;
STATEB = ^HB;
STATEC = ^H9;
STATED = ^HE;
STATEF = ^HD;

FALSE = 0;
TRUE  = 1;

MEMACC =  PBAD31 &  PBAD30 & DBADS & !DBMMIO;

QSTATE = [Q3,Q2,Q1,Q0];

"Actual logic equations.
``` equations state_diagram QSTATE

State STATE0: " Idle, waiting for a reqular access.

```
" Reset.
IF (DBCLR) THEN STATE0
    WITH    ADLTCH := FALSE;
    ENDWITH;

" No access.
IF (!MEMACC & !DBCLR) THEN STATE0
    WITH    ADLTCH := FALSE;
    ENDWITH;

" Read access.
IF (MEMACC & !DBWRRD & !PBAD25 & !DBCLR ) THEN
STATEC
    WITH    ADLTCH := TRUE;
    ENDWITH;

" Read access.
IF (MEMACC & !DBWRRD &  PBAD25 & !DBCLR ) THEN
STATEC
    WITH    ADLTCH := TRUE;
    ENDWITH;
```

State STATEC: " Normal access, wait before asserting
            cas.

```
" Reset.
IF (DBCLR) THEN STATE0
    WITH    ADLTCH := FALSE;
    ENDWITH;

IF (!DBCLR & !PBAD25 & !DBWRRD) THEN STATE8
    WITH    ADLTCH := TRUE;
    ENDWITH;

IF (!DBCLR & PBAD25 & !DBWRRD) THEN STATE8
    WITH    ADLTCH := TRUE;
    ENDWITH;

IF (!DBCLR & !PBAD25 & DBWRRD) THEN STATE8
    WITH    ADLTCH := TRUE;
    ENDWITH;

IF (!DBCLR & PBAD25 & DBWRRD) THEN STATE8
    WITH    ADLTCH := TRUE;
    ENDWITH;
```

State STATE8: " Assert CAS.

```
" Reset.
IF (DBCLR) THEN STATE0
    WITH    ADLTCH := FALSE;
    ENDWITH;
```

" Read access, assert both even and odd cas and
    ADLTCH.
IF (!DBCLR & !DBWRRD & !PBAD25) THEN STATEA
    WITH    ADLTCH := TRUE;
    ENDWITH;

" Read access, assert both even and odd cas and
    ADLTCH.
IF (!DBCLR & !DBWRRD & PBAD25) THEN STATEA
    WITH    ADLTCH := TRUE;
    ENDWITH;

State STATEA: " Even and Odd cas asserted one clock,
            read access.

" Reset.
    IF (DBCLR) THEN STATE0
        WITH    ADLTCH := FALSE;
        ENDWITH;

" Blst not asserted, multiple transfer.
    IF (!DBCLR & !DBBLAST & !PBAD25) THEN STATE1
        WITH    ADLTCH := TRUE;
        ENDWITH;

" Blst not asserted, multiple transfer.
    IF (!DBCLR & !DBBLAST &  PBAD25) THEN STATE1
        WITH    ADLTCH := TRUE;
        ENDWITH;

" Blst asserted, single transfer.
    IF (!DBCLR & DBBLAST ) THEN STATE0
        WITH    ADLTCH := FALSE;
        ENDWITH;

State STATE1: " Read access, first word returned to
            microprocessor.

" Reset.
    IF (DBCLR) THEN STATE0
        WITH    ADLTCH := FALSE;
        ENDWITH;

" Even word returned, blst not asserted.
    IF (!PBAD25 & !DBCLR ) THEN STATE2
        WITH    ADLTCH := TRUE;
        ENDWITH;

" Odd word returned, blst not asserted.
    IF (PBAD25 & !DBCLR ) THEN STATE2
        WITH    ADLTCH := TRUE;
        ENDWITH;

State STATE2: " Read access, second word returned to
            microprocessor.

" Reset.
    IF (DBCLR) THEN STATE0

```
        WITH    ADLTCH := FALSE;
        ENDWITH;

" Odd word returned, blst not asserted.
    IF (!PBAD25 & !DBCLR & !DBBLAST) THEN STATE3
        WITH    ADLTCH := TRUE;
        ENDWITH;

" Even word returned, blst not asserted.
    IF (PBAD25 & !DBCLR & !DBBLAST) THEN STATE3
        WITH    ADLTCH := TRUE;
        ENDWITH;

" Blst asserted.
    IF (DBBLAST & !PBAD25 & !DBCLR) THEN STATEB
        WITH    ADLTCH := TRUE;
        ENDWITH;

" Blst asserted.
    IF (DBBLAST &  PBAD25 & !DBCLR) THEN STATEB
        WITH    ADLTCH := TRUE;
        ENDWITH;

State STATE3: " Read access, a wait state.

" Reset.
    IF (DBCLR) THEN STATE0
        WITH    ADLTCH := FALSE;
        ENDWITH;

" Blst unasserted.
    IF (!DBCLR & !DBBLAST ) THEN STATE0
        WITH    ADLTCH := FALSE;
        ENDWITH;

" Blst asserted, 2nd even word returned.
    IF (!DBCLR & DBBLAST ) THEN STATED
        WITH    ADLTCH := FALSE;
        ENDWITH;

State STATE4:
    "Reset.
    IF (DBCLR) THEN STATE0
        WITH    ADLTCH := FALSE;
        ENDWITH;

IF (!DBCLR) THEN STATEF
        WITH    ADLTCH := FALSE;
        ENDWITH;

State STATEB:

" Reset.
    IF (DBCLR) THEN STATE0
        WITH    ADLTCH := FALSE;
        ENDWITH;

IF (!DBCLR & !MEMACC) THEN STATED
```

```
            WITH    ADLTCH := FALSE;
            ENDWITH;

IF (!DBCLR & MEMACC) THEN STATE4
            WITH    ADLTCH := FALSE;
            ENDWITH;

State STATED: " Just raised RAS, check for DBADS.

" Reset.
        IF (DBCLR) THEN STATE0
            WITH    ADLTCH := FALSE;
            ENDWITH;

IF (!DBCLR & !MEMACC) THEN STATE0
            WITH    ADLTCH := FALSE;
            ENDWITH;

IF (!DBCLR & MEMACC) THEN STATEF
            WITH    ADLTCH := FALSE;
            ENDWITH;

State STATEF: " Precharged RAS so do next cycle.

" Reset.
        IF (DBCLR) THEN STATE0
            WITH    ADLTCH := FALSE;
            ENDWITH;

" Read access.
        IF (!DBWRRD & !PBAD25 & !DBCLR ) THEN STATEC
            WITH    ADLTCH := TRUE;
            ENDWITH;

" Read access.
        IF (!DBWRRD &  PBAD25 & !DBCLR ) THEN STATEC
            WITH    ADLTCH := TRUE;
            ENDWITH;
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system comprising:
    a synchronous bus having address, command and data sections and operating according to a predetermined bus protocol;
    a unit coupled to said bus for generating commands for reading and writing memory, one of said commands specifying a burst operation in which any one of a plurality of predetermined sequences of addresses having a different initial address is supplied to said bus by said unit during a plurality of successive memory read cycles of operation; and
    a memory tightly coupled to said unit through said synchronous bus, said memory comprising:
    a pair of dynamic random access memories (DRAMs) coupled to said bus, said DRAMs being organized for storing data words having even and odd addresses for enabling read out of a plurality of words during each memory read cycle of operation, each of said DRAMs having an identical width, the sum of the widths being no more than twice as wide as said data section of said bus and each DRAM including first and second data output circuits for receiving said plurality of data words read out during a predetermined number of successive memory read cycles of operation, said first and second data output circuits including a plurality of transparent latch circuits and tristate buffer driver circuits respectively;
    an address register for storing said initial address of each of said plurality of predetermined address sequences; and,
    address sequence control circuit means coupled to said DRAMs, said address sequence control circuit means including:
    first logic circuit means coupled to said address register, said first logic circuit means for selectively generating an output control signal for modifying the state of a first predetermined address bit signal of an initial address supplied to said DRAMs during a predetermined one of said number of said successive cycles of operation for generating all of said addresses for a first number of said plurality of predetermined address sequences; and, second logic circuit means coupled to said address section of said bus and to said plurality of said transparent latch circuits and said tristate buffer driver circuits of said first and second output data circuits respectively, of each of said DRAMs, said second logic circuit means including means for storing an indication of the state of a second predetermined address bit signal of said initial address of said one of said predetermined address sequences and means for selectively enabling different ones of said first and second data output circuits of said each of said DRAMs as a function of said state of said indication of said state of said second address bit signal stored by said means for storing during said predetermined number of said successive cycles of operation for transferring data read out to said output data circuits during a plurality of bus cycles in an order corresponding to said addresses of a second number of said plurality of address sequences and which enables immediate transfer of pairs of said data words through said tristate buffer driver circuits.

2. The system of claim 1 wherein said DRAMs are enabled so that a first pair of said plurality of words read out during a first memory cycle of operation are stored in said plurality of transparent latch circuits and a next pair of said plurality of words read out during a next memory cycle of operation are supplied to said plurality of tristate buffer driver circuits for immediate transfer under control of said second logic circuit means.

3. The system of claim 2 wherein said each address includes a first address portion and a second address portion which includes said first predetermined address bit signal and wherein said register means includes first and second address registers coupled to said address section of said bus, to said address sequence control circuit means and to said DRAMs, said first and second address registers being enabled by said address sequence control circuit means for storing said first and second address portions of said initial address in response to said one of said commands specifying said burst operation and for applying in succession, said first and second address portions to said DRAMs during first and second intervals of each read cycle of operation for reading out a pair of words stored in even and odd addresses.

4. The system of claim 3 wherein said system further includes increment/decrement circuit means connected to said address register, to said DRAMs, and to said address sequence control circuit means, said increment/decrement circuit means inverting said state of said first predetermined address bit signal in response to said output control signal for modifying said state of said first predetermined address bit during said second interval of said predetermined number of said successive memory read cycles of operation for addressing a different group of data words.

5. The system of claim 4 wherein said system further includes a clock generator for generating a single frequency clock reference signal, said clock generator being coupled to said address sequence control circuit means for synchronizing said operations of said control circuit means with said bus.

6. The system of claim 5 wherein said first logic circuit means includes a first programmable array logic (PAL) circuit coupled to said clock generator and to said address section of said bus for storing said indication of said first predetermined address bit, said PAL circuit being programmed to generate a sequence of state signals in response to said clock reference signal for defining the state of said output control signal during said first and second intervals of each read cycle of operation.

7. The system of claim 6 wherein said first PAL circuit forces said output control signal to a first state for enabling said increment/decrement circuit means to supply said first predetermined address bit signal in unmodified form to said DRAMs during each first interval and to a second state for enabling said increment/decrement circuit means to supply said first predetermined address bit signal in inverted form to said DRAMs.

8. The system of claim 7 wherein said first predetermined address bit signal defines a word address in said DRAMs.

9. The system of claim 5 wherein said second logic circuit means includes a second PAL circuit coupled to said clock generator circuit and to said address section of said bus for receiving said second predetermined address bit, said second PAL circuit being programmed for generating sequences of state signals in response to said clock reference signal, said second PAL circuit being conditioned by said second predetermined address bit to generate sequences of enable signals at intervals defined by said state signals for selectively enabling said first and second output circuits of each DRAM to transfer said plurality of words according to the address sequence defined by said initial address.

10. A system comprising:
a synchronous bus having address, command and data sections and operating according to a predetermined bus protocol;
a unit coupled to said bus for generating commands for reading and writing memory, one of said commands specifying a burst operation in which any one of a plurality of predetermined sequences of addresses having a different initial address is supplied to said bus by said unit during a plurality of successive memory read cycles of operation;
a memory tightly coupled to said unit through said synchronous bus, said memory comprising:
a pair of dynamic random access memories (DRAMs) coupled to said bus, said DRAMs being organized for storing data words having even and odd addresses for enabling read out of a plurality of words during each memory read cycle of operation, each of said DRAMs having an identical width, the sum of the widths being no more than twice as wide as said data section of said bus and each DRAM memory including first and second data output circuits for receiving said plurality of data words read out during a predetermined number of successive memory read cycles of operation;
an address register for storing said initial address of each of said plurality of predetermined address sequences; and address sequence control circuit means coupled to said DRAMs, said address sequence control circuit means including:

first logic circuit means coupled to said address register, said first logic circuit means for selectively generating an output control signal for modifying the state of a first predetermined address bit signal of an initial address applied to said DRAMs during a predetermined one of said number of said successive memory read cycles of operation for generating all of said addresses for a first number of said plurality of predetermined address sequences; and, second logic circuit means coupled to said address section of said bus and to said first and second output data circuits of each of said DRAMs, said second logic circuit means including means for storing an indication of the state of a second predetermined address bit signal of said initial address of said one of said predetermined address sequences and means for selectively enabling different ones of said first and second data output output circuits of each of said DRAM memories as a function of said state of said indication of said state of second address bit signal stored by said means for storing during said predetermined number of said successive cycles of operation for transferring data read out to said first and second data output circuits during a plurality of bus cycles in an order corresponding to said addresses of a second number of said plurality of predetermined address sequences; and, increment/decrement circuit means connected to said address register, to said DRAMs, and to said address sequence control circuit means, said increment/decrement circuit means including a pair of tristate driver circuits and an inverter circuit, one of said pair of tristate driver circuits being connected to said address register for receiving said first predetermined address bit signal applied to said DRAMs, said inverter circuit being connected in common with said one tristate driver circuit for receiving said first predetermined address bit signal and to the other one of said pair of tristate driver circuits for applying an inverted first predetermined address bit signal, said other one of said pair of tristate driver circuits being connected to supply said inverted first predetermined address bit signal to said DRAMs, and said first logic circuit means being connected to said one and said other one of said pair of tristate driver circuits for supplying said output control signal and an inversion of said output control signal respectively for conditioning said tristate driver circuits during first and second intervals of each of said successive number of read cycles of operation for reading out a pair of words stored at even and odd addresses.

* * * * *